United States Patent [19]

Wei et al.

[11] Patent Number: 5,723,950

[45] Date of Patent: Mar. 3, 1998

[54] PRE-CHARGE DRIVER FOR LIGHT EMITTING DEVICES AND METHOD

[75] Inventors: Chengping Wei, Gilbert; Franky So, Tempe; Michael P. Norman, Chandler, all of Ariz.

[73] Assignee: Motorola, Schaumburg, Ill.

[21] Appl. No.: 662,719

[22] Filed: Jun. 10, 1996

[51] Int. Cl.⁶ .................................................. G09G 3/12
[52] U.S. Cl. ........................ 315/169.3; 315/307; 345/78
[58] Field of Search ............................. 345/204, 211, 345/212, 215, 76, 77, 78; 315/169.1, 169.3, 169.4, 307

[56] References Cited

U.S. PATENT DOCUMENTS 5,552,677  9/1996  Pagones ................... 315/169.1
5,578,906 11/1996  Smith ...................... 315/169.3

Primary Examiner—Robert Pascal
Assistant Examiner—Arnold Kinkead
Attorney, Agent, or Firm—Eugene A. Parsons

[57] ABSTRACT

A precharge driver for light emitting devices with an associated capacitance, the precharge driver including a driver coupled to a light emitting device so as to supply a substantially square wave of current to the light emitting device and a precharge circuit coupled to the driver so as to activate the driver to supply a pulse of current to the associated capacitance of the light emitting device to rapidly charge the associated capacitance at an initial portion of the square wave of current, whereby a resultant substantially square wave of current is applied to the light emitting device.

8 Claims, 2 Drawing Sheets

$I_D = I - I_C$

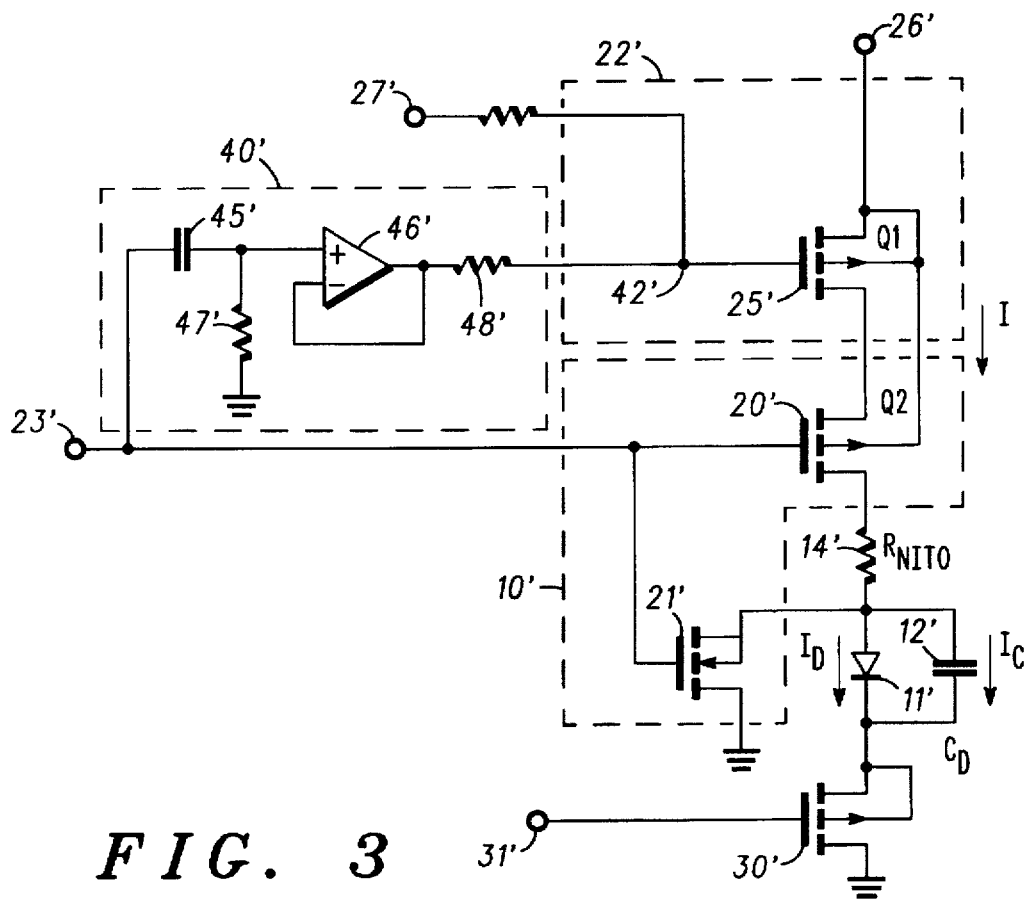
*FIG. 3*
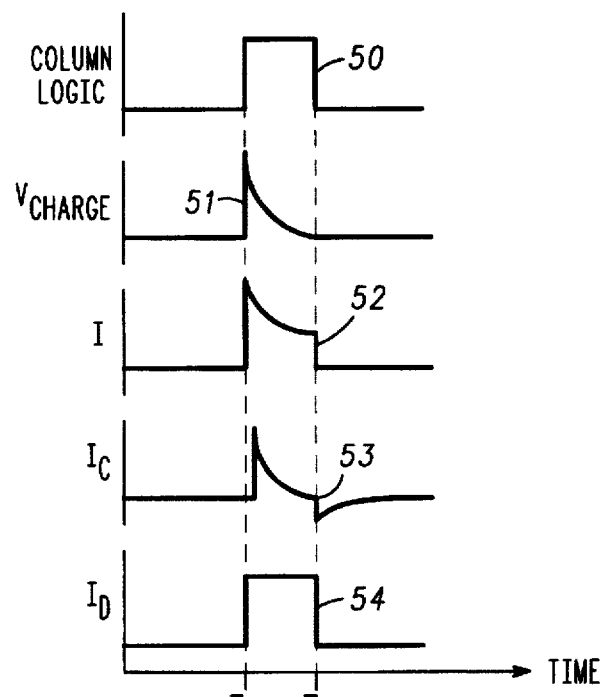
*FIG. 2*   $I_D = I - I_C$

PRE-CHARGE DRIVER FOR LIGHT EMITTING DEVICES AND METHOD

FIELD OF THE INVENTION

The present invention pertains to drivers for light emitting devices and more specifically to current drivers for current activated light emitting devices.

BACKGROUND OF THE INVENTION

Light emitting device (LED) arrays are becoming more popular as an image source in both direct view and virtual image displays. One reason for this is the fact that LEDs are capable of generating relatively high amounts of light (high luminance), which means that displays incorporating LED arrays can be used in a greater variety of ambient conditions. For example, reflective LCDs can only be used in high ambient light conditions because they derive their light from the ambient light, i.e. the ambient light is reflected by the LCDs. Some transflective LCDs are designed to operate in a transmissive mode and incorporate a backlighting arrangement for use when ambient light is insufficient. In addition, transflective displays have a certain visual aspect and some users prefer a bright emissive display. However, these types of displays are generally too large for practical use in very small devices.

Also, organic LED arrays are emerging as a potentially viable design choice for use in small products, especially small portable electronic devices, such as pagers, cellular and portable telephones, two-way radios, data banks, etc. Organic LED arrays are capable of generating sufficient light for use in displays under a variety of ambient light conditions (from little or no ambient light to bright ambient light). Further, organic LEDs can be fabricated relatively cheaply and in a variety of sizes from very small (less than a tenth millimeter in diameter) to relatively large (greater than an inch) so that organic LED arrays can be fabricated in a variety of sizes. Also, LEDs have the added advantage that their emissive operation provides a very wide viewing angle.

Generally, organic LEDs include a first electrically conductive layer (or first contact), an electron transporting and emission layer, a hole transporting layer and a second electrically conductive layer (or second contact). The light can be transmitted either way but must exit through one of the conductive layers. There are many ways to modify one of the conductive layers for the emission of light therethrough but it has been found generally that the most efficient LED includes one conductive layer which is transparent to the light being emitted. Also, one of the most widely used conductive, transparent materials is indium-tin-oxide (ITO), which is generally deposited in a layer on a transparent substrate such as a glass plate.

The major problem with LEDs and especially organic LEDs is an associated capacitance, which includes internal capacitance produced by the overlying layers of material and conductors and capacitance produced by the row and column conductors in an array. Further exacerbating this problem is the fact that organic LEDs are current driven devices (i.e. emit due to current flowing through them), as opposed to voltage driven devices, such as LCDs. Thus, when activating an organic LED, especially in an array, the initial current supplied thereto is used to charge the associated capacitance. As the arrays get larger and/or the devices get larger the associated capacitance increases and more current is required to provide the initial charge. Because the charge time of the capacitance is dependent upon the resistance coupling the current source to the capacitance, as well as the size of the capacitance (RC time), the driving speed is substantially reduced as sizes increase. The problem is increased with organic LEDs because the conductive, transparent layer utilized is generally high resistivity material. ITO, for example, has a resistivity of approximately 50 ohms/square (75 to several hundred ohms/square). Thus, the combination of the high resistivity contact of the organic LED and the associated capacitance becomes virtually prohibitive when attempting to place organic LEDs in large arrays.

Accordingly, it would be beneficial to provide improved driving apparatus for organic LED arrays which overcomes these problems.

It is a purpose of the present invention to provide a new and improved precharge driver for organic LED arrays.

It is another purpose of the present invention to provide new and improved driving apparatus for organic LED arrays which improves the driving speed of the arrays.

It is another purpose of the present invention to provide a new and improved driving apparatus for organic LED arrays which produces relatively constant light.

It is another purpose of the present invention to provide a new and improved driving apparatus for organic LED arrays which is capable of incorporating pulse width modulation.

SUMMARY OF THE INVENTION

The above problems and others are at least partially solved and the above purposes and others are realized in a precharge driver for light emitting devices with an associated capacitance. The precharge driver includes a driver circuit coupled to a light emitting device so as to supply a substantially square wave of current to the light emitting device and a precharge circuit coupled to the driver so as to activate the driver to supply a pulse of current to the associated capacitance of the light emitting device to rapidly charge the associated capacitance at an initial portion of the square wave of current, whereby a resultant substantially square wave of current is applied to the light emitting device.

BRIEF DESCRIPTION OF THE DRAWINGS

Referring to the drawings:

FIG. 3 is a schematic diagram of a driver and light emitting device in accordance with the present invention; and FIG. 4 is a graphical representation of current and voltage waveforms at various points in the circuit of FIG. 3.

DESCRIPTION OF THE PREFERRED EMBODIMENT

Figure 1:
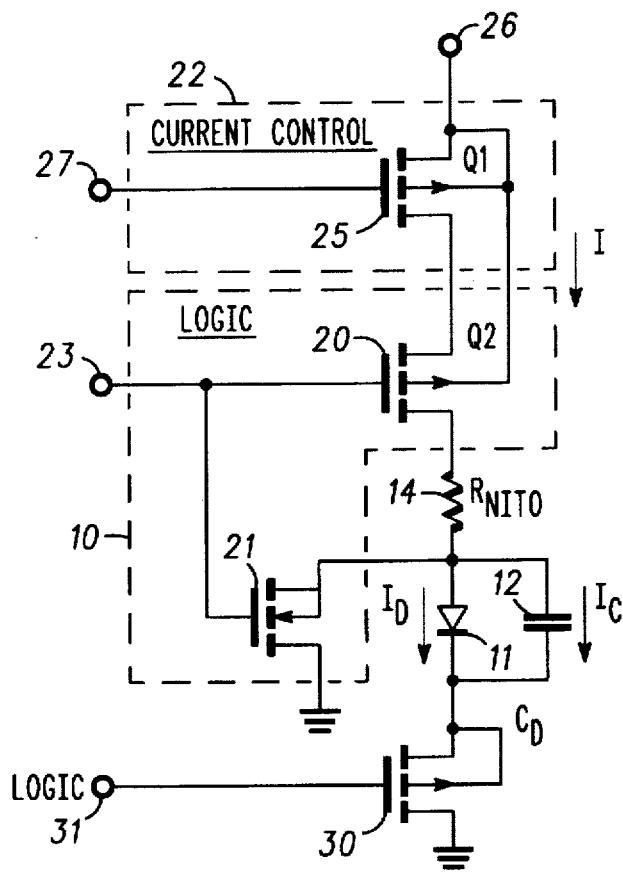
FIG. 1 is a schematic diagram of a driver and light emitting device.

Turning now to the drawings, FIG. 1 is a schematic diagram of a driver 10 and light emitting device (LED) 11 which is being explained to illustrate problems which arise when driving a light emitting device having a capacitance associated therewith. LED 11 has a capacitance 12 associated therewith, which includes internal capacitance and any capacitance in the electrical connections between LED 11 and driver 10, etc. In the present example, LED 11 is an organic light emitting device (although it is anticipated that other light emitting devices having associated capacitance might be utilized) which includes internal capacitance due to overlying layers of material sandwiched between electrical conductors. Further, LED 11 is one pixel in a two dimensional array of pixels and the column and row conductors add some capacitance to the devices.

Generally, either the anode (positive electrical contacts) or the cathode (negative electrical contacts) of an organic LED must be optically transparent to allow the emission of light therethrough. In this embodiment organic LED 11 includes a substrate (not shown) which is formed of a transparent material, such as glass, quartz, or a hard plastic or the like. Even some semiconductor materials are transparent to light and may be utilized as the substrate, in which instance some of the electronics may be integrated directly onto the substrate. A positive conductive layer is patterned onto the upper surface of the substrate in any of the many well known procedures, e.g. using photoresist or the like. The conductive layer is patterned into a plurality of parallel spaced apart columns terminating in column I/O terminals. While the conductive layer may be formed of any organic or inorganic conductors, such as conductive polyaniline (PANI) or indium-tin-oxide (ITO), which are substantially transparent to visible light, in this specific example, the conductive layer is provided as a layer of ITO.

A hole transport layer is positioned on the upper surface of the conductive layer. Generally, for convenience in manufacturing the array, hole transport layer is deposited as a blanket deposition over the upper surface of the conductive layer and any exposed portions of the substrate, since only the portion of the hole transport layer which overlies the conductive layer will be activated. An electron transport and light emission layer is positioned over the upper surface of the hole transport layer. It should be understood that organic devices are presently being fabricated with one to several organic layers and the described example of organic LED 11 is only included for purposes of this explanation. Also, to reduce the potential required in embodiments not incorporating an electron transport layer, a cathode is generally formed of a negative conductive layer of low work function metal/conductors or combination of metals/conductors, at least one of which typically has a low work function. In this example the cathode is formed of low work function material, such as the commonly used lithium or magnesium, or the cathode may be a conductive metal incorporating cesium, calcium or the like.

Assume for purposes of this explanation that an array is constructed with a light emitting device (e.g. device 11) connected between each crossing of each column conductor and each row conductor. The conductive layer is patterned on the substrate to form the column conductors and associated I/O terminals. The negative conductive layer is patterned to form the row conductors and associated I/O terminals. Because the positive conductive layer must be transparent to the light generated by the devices, it generally has a relatively high resistance. Further, since the rows are cycled ON one row at a time, the maximum number of devices that will be conducting in a column at a time is one. Thus, each of the column conductors will carry a maximum current equal to the current conducted by one LED 11 (e.g. approximately 1–2 mA).

Assuming, for example, that ITO is used to form the column conductors, the resistivity ranges from about 7.5 ohms/square to 400 ohms/square. While the resistivity can be lowered by increasing the thickness of the column conductors, there are problems with uniformity of ITO which can lead to device defects as the conductor is thickened. Thus, a typical column conductor formed of ITO may be approximately 50 ohms/square. The resistance along a column conductor between adjacent rows would then be about 80 ohms. Over 30 rows, at 80 ohms/row, this results in a total of over 2.4 kohms of resistance between the first and the last LED in the column. Since one LED draws a current of approximately 1–2 mA, this gives a 2–5 volt difference for driving the same current into the last LED versus the first LED in the column.

Driver 10 is connected to LED 11 (represented as a single light emitting diode although additional LEDs may be incorporated in a single pixel for redundancy or color)) through an associated resistance 14 (which is considered a part of LED 11 for this explanation). Associated resistance 14 represents the resistance of the column conductor for the two dimensional array, as well as the row conductor and any resistance of the LEDs themselves.

Driver 10, in this embodiment is a column driver for the two dimensional array of pixels and each column, or group of columns, in the two dimensional array includes a similar driver. Driver 10 includes a first transistor 20 and a second transistor 21. Transistor 20 is connected between a current supply 22, and one terminal of LED 11, by way of associated resistance 14. Transistor 20 is connected to allow current flow to LED 11 from current supply 22 when first and second transistors 20 and 21 are turned ON and OFF, respectively. Transistors 20 and 21 each have a control terminal connected to receive a column logic or address signal thereon from an input terminal 23 when the column containing LED 11 is being addressed. A third transistor 25, which is a controllable current source, in current supply 22 has a current carrying terminal connected to a current carrying terminal of transistor 20 and a second current carrying terminal connected to a power source represented by an external terminal 26. Transistor 25 has a control terminal connected to receive a current control signal thereon from an input terminal 27. The current control signal controls transistor 25 to allow more or less current to flow therethrough and may be similar to, for example, a brightness control or the like.

In operation, a column logic signal (generally a positive square wave) applied to terminal 23 turns transistor 20 ON, thereby connecting LED 11 to the drain of transistor 25, and turning transistor 21 OFF, thereby removing the ground from LED 11. To complete the circuit, a transistor 30 is connected between a second terminal of LED 11 and ground, or other return for the current source, and operates as a current sink. Transistor 30 has a control terminal connected to receive a row logic signal thereon from an input terminal 31 when the row containing LED 11 is being addressed.

Figure 2:
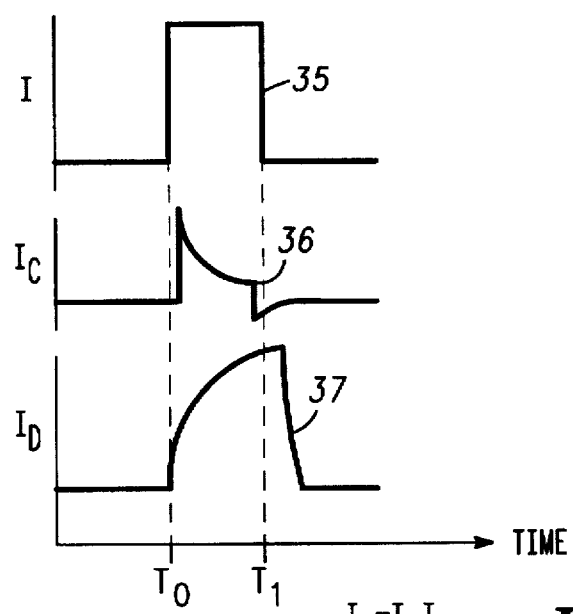
FIG. 2 is a graphical representation of current waveforms at various points in the circuit of FIG. 1.

When both the column and row logic signals are applied to terminals 23 and 31, respectively, a current "I", illustrated by waveform 35 in FIG. 2, is applied to LED 11. However, since LED 11 includes associated capacitance 12, virtually all of the current initially flows into associated capacitance 12 as a charging current. The charging of associated capacitor 12 typically depends upon the RC time constant of the charging circuit (which also contains resistance 14) and follows a curve generally similar to waveform 36 of FIG. 2. Since a large portion of the current is initially used to charge associated capacitance 12, the current actually flowing through LED 11 and producing light follows a curve generally similar to waveform 37 of FIG. 2. The slow rise and fall times of the driving pulse, due to high pixel capacitance and conductor resistivity, greatly limits driving speeds, multiplex ratios and display size. Also, as materials and sizes of the two dimensional array change, associated capacitance 12 and resistance 14 also change. Intensity of the light produced is proportional to the current pulse height and width. Efficiency of operation, however, depends upon keeping the intensity constant rather than peaks and valleys in the drive current, so that it is highly desirable to produce a constant pulse of current through LED 11.

Referring now to FIG. 3, a schematic diagram is illustrated of a driver 10' and light emitting device 11' in accordance with the present invention. In this embodiment, components which are similar to FIG. 1 are designated with similar numbers and a prime is added to all numbers to indicate the different embodiment. Further, only the operations of the circuit of FIG. 3 which are different from the operations of the circuit of FIG. 1 will be explained in detail.

A precharge circuit 40' is provided which includes an input terminal 41' and an output terminal 42'. In this specific embodiment, input terminal 41' is connected to column logic input terminal 23' and output terminal 42' is connected to the control electrode of transistor 25', along with current control terminal 27'. Circuit 40' includes a capacitor 45' with one terminal connected to input terminal 41' and a second terminal connected to a first input of an operational amplifier 46'. A resistor 47' is connected between the first input of operational amplifier 46' and ground (or other common). An output of operational amplifier 46' is connected to a second input thereof and through a resistor 48' to output terminal 42'. As will be seen presently, capacitor 45' and resistor 47' operate essentially as a differentiator while operational amplifier 46' and resistor 48' serve as a buffer to prevent loading of driver 10'.

In some specific applications various components of the disclosed precharge driver may be shared (by switching) in several or all of the various driver circuits associated with each LED in the array. For example, while precharge circuit 40' is illustrated in FIG. 3 as "hardwired" to current source 22', it will be understood by those skilled in the art that a single precharge circuit 40' can be used with a plurality of column drivers, in which case some switching circuitry (not shown) would be included between output terminal 42' and the control terminal of current source 22'.

In operation, a positive logic square wave, generally depicted by waveform 50 of FIG. 4, is applied to column logic input terminal 23'. The positive logic square wave is differentiated by capacitor 45' and resistor 46' to produce a sharp positive pulse, generally depicted by waveform 51 of FIG. 4, through operational amplifier 46' and resistor 48' to the control terminal of transistor 25'. Simultaneously, the positive logic square wave is applied to the control terminal of transistor 20'. Thus, a generally square wave of current with a sharp initial pulse of current riding on top, generally as depicted by waveform 52 of FIG. 4, is applied to LED 11' (including associated capacitance 12' and resistance 14'). The initial sharp pulse of current rapidly charges associated capacitance 12', which charging current is depicted by waveform 53 of FIG. 4, whereby a resultant substantially square pulse of current, depicted by waveform 54 of FIG. 4, flows through LED 11'.

While some additional current is applied for driving purposes, the result is a relatively flat constant pulse of current flowing through the LED and, therefore, a relatively constant intensity of light produced. Because of the constant intensity, the efficiency is improved. Further, because of the fast charging of the associated capacitance, driving speeds are improved and larger two dimensional arrays can be used. With the improved driving speeds, pulse width modulation power supplies can be used, which in turn allows gray scale type activation in displays utilizing the present two dimensional arrays. Also, because of the fast charging of the associated capacitance, higher multiplex ratios can be used.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A precharge driver for organic light emitting devices with an associated capacitance, the precharge driver comprising:

a current driver including a first transistor connected between a current source and one terminal of an organic light emitting device, the first transistor being connected to supply current to the organic light emitting device from the current source when the first transistor is activated and an address input connected to a control terminal of the first transistor for activating the first transistor upon receiving a positive logic square wave, the current driver being coupled to the organic light emitting device included in a two dimensional array of organic light emitting devices so as to supply a substantially square wave of current to the organic light emitting device; and a precharge circuit coupled to the current driver so as to activate the current driver to supply a pulse of current to the associated capacitance of the organic light emitting device to rapidly charge the associated capacitance at an initial portion of the square wave of current, whereby a resultant substantially square wave of current is applied to the organic light emitting device, the precharge circuit being coupled to receive the positive logic square wave at an input terminal thereof and being further coupled to a control terminal of the current source for supplying a sharp positive pulse to the control terminal of the current source upon receiving the positive logic square wave.

2. A precharge driver as claimed in claim 1 wherein the precharge circuit includes a differentiating circuit.

3. A precharge driver as claimed in claim 2 wherein the precharge circuit further includes a buffer connected between the differentiating circuit and the driver.

4. A precharge driver for organic light emitting devices with associated capacitance, the precharge driver comprising:

a current source having a control terminal;

a driver including a first transistor having a first current carrying terminal coupled to one terminal of an organic light emitting device and a second current carrying terminal coupled to the current source, the driver being coupled to the organic light emitting device so as to supply a substantially square wave of current to the organic light emitting device, an address input connected to a control terminal of the first transistor for activating the first transistor upon receiving a positive logic square wave so as to supply a substantially square wave of current to the organic light emitting device; and a precharge circuit coupled to the control terminal of the current source so as to activate the current source to supply a pulse of current through the first transistor to the associated capacitance of the organic light emitting device to rapidly charge the associated capacitance at an initial portion of the square wave of current, whereby a resultant substantially square wave of current is applied to the organic light emitting device.

5. A method of precharging an associated capacitance of a light emitting device comprising the steps of:

provinding a two dimensional array of light emitting devices, each of the light emitting devices having an associated capacitance;

coupling a substantially square wave of current to a light emitting device utilizing a logic square wave to initiate the coupling of the substantially square wave of current; and coupling a pulse of current to the associated capacitance of the light emitting device to rapidly charge the associated capacitance at an initial portion of the square wave of current, including differentiating the logic square wave to produce a control pulse and utilizing the control pulse to initiate the coupling of the pulse of current to the associated capacitance and thereby supplying a resultant substantially square wave of current to the light emitting device.

6. A method of precharging an associated capacitance of a light emitting device as claimed in claim 5 wherein the step of providing the two dimensional array of light emitting devices includes providing a two dimensional array of organic light emitting devices.

7. A method of precharging an associated capacitance of a light emitting device comprising the steps of:

providing a two dimensional array of light emitting devices, a plurality of drivers and a precharge circuit, each of the plurality of drivers having first and second inputs;

coupling each of the drivers to a current source;

coupling an addressed driver to a light emitting device and activating the addressed driver so as to supply a substantially square wave of current to the light emitting device; and coupling the precharge circuit to the addressed driver and activating the addressed driver to supply a pulse of current to the associated capacitance of the light emitting device to rapidly charge the internal capacitance at an initial portion of the square wave of current, thereby supplying a resultant substantially square wave of current to the light emitting device.

8. A method of precharging an associated capacitance of a light emitting device as claimed in claim 7 wherein the step of providing the two dimensional array of light emitting devices includes providing a two dimensional array of organic light emitting devices.

\* \* \* \* \*